United States Patent [19]

Wise

[11] Patent Number: 4,605,499
[45] Date of Patent: Aug. 12, 1986

[54] WATER FILTER

[76] Inventor: Lawrence Wise, 4330 Hillcrest Dr., Apt. #804, Hollywood, Fla. 33021

[21] Appl. No.: 703,125

[22] Filed: Feb. 19, 1985

[51] Int. Cl.⁴ .............................................. B01D 23/14
[52] U.S. Cl. .................................... 210/282; 210/484
[58] Field of Search ............... 210/282, 281, 287–289, 210/484, 496, 470

[56] References Cited

U.S. PATENT DOCUMENTS

| | | | |
|---|---|---|---|
| 651,948 | 6/1900 | Lawson | 210/282 |
| 2,761,833 | 9/1956 | Ward | 210/282 X |
| 3,392,837 | 7/1968 | Sanzenbacher | 210/282 |
| 3,469,696 | 9/1969 | Petrucci et al. | 210/97 |
| 3,900,395 | 8/1975 | Hirs | 210/80 |
| 4,016,080 | 4/1977 | Williams | 210/284 |
| 4,025,438 | 5/1977 | Gelman et al. | 210/484 |
| 4,401,447 | 8/1983 | Huber | 210/282 X |
| 4,419,235 | 12/1983 | Sway | 210/282 |
| 4,443,336 | 4/1984 | Bennethum | 210/282 X |

*Primary Examiner*—Thomas Wyse
*Attorney, Agent, or Firm*—Oltman and Flynn

[57] ABSTRACT

A disposable, portable water filter that is suited for filtering small quantities of drinking water. In one embodiment the filter may be placed over a jar or drinking glass and unfiltered water poured into the jar or glass through the filter. In another embodiment, the filter includes the jar which has a lid with a rim that fits tightly around the neck of the jar. The lid may have an opening for pouring unfiltered water into the jar and filtered water out from the jar. The lid may have an opening for pouring unfiltered water into the jar and filtered water out from the jar. The filter thereby provides twice the filtering effect. The filter in a preferred embodiment consists of containing material that forms a pouch for holding the filter medium and a skirt for suspending the filter. In another embodiment the filter may consist of one sheet of metal foil shaped like a bowl for containing the filter medium, and has handles extending from the bowl for holding the filter over a jar or drinking glass.

4 Claims, 14 Drawing Figures

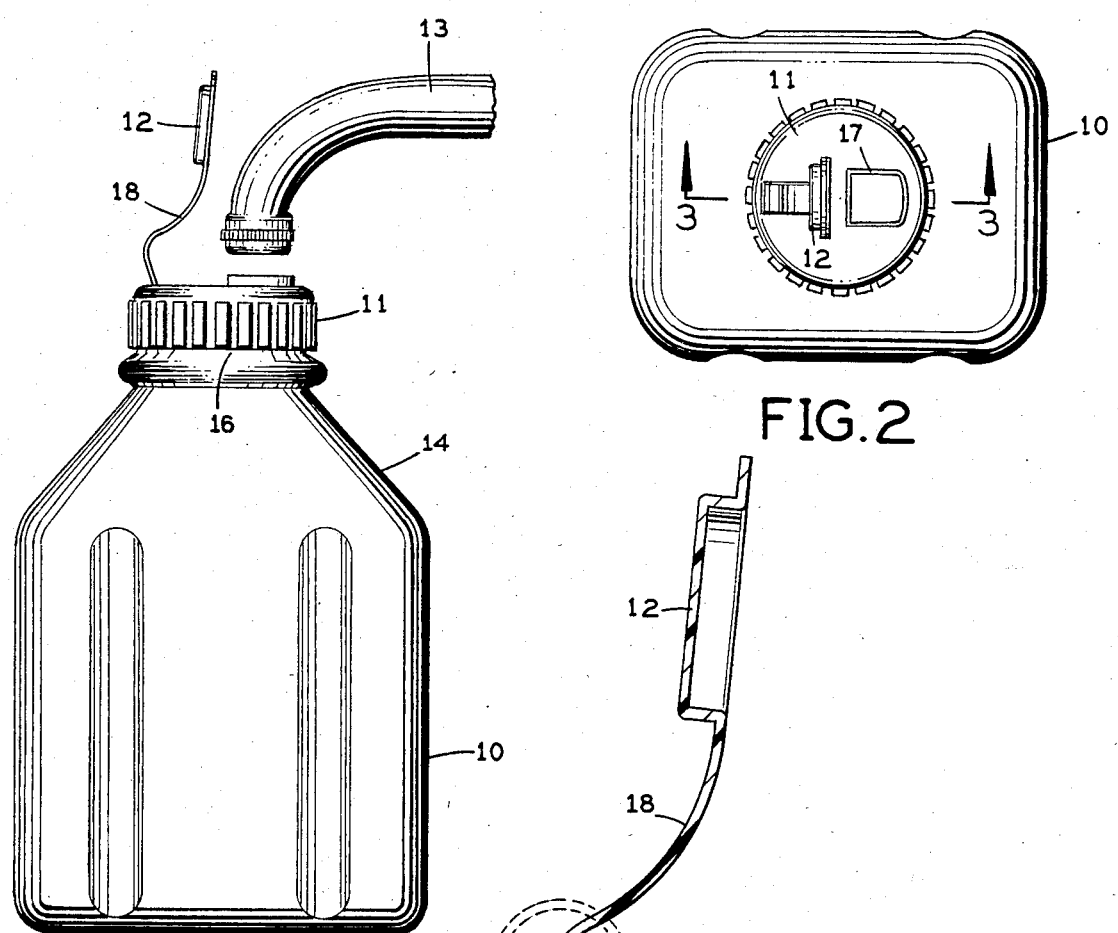
FIG.1
FIG.2
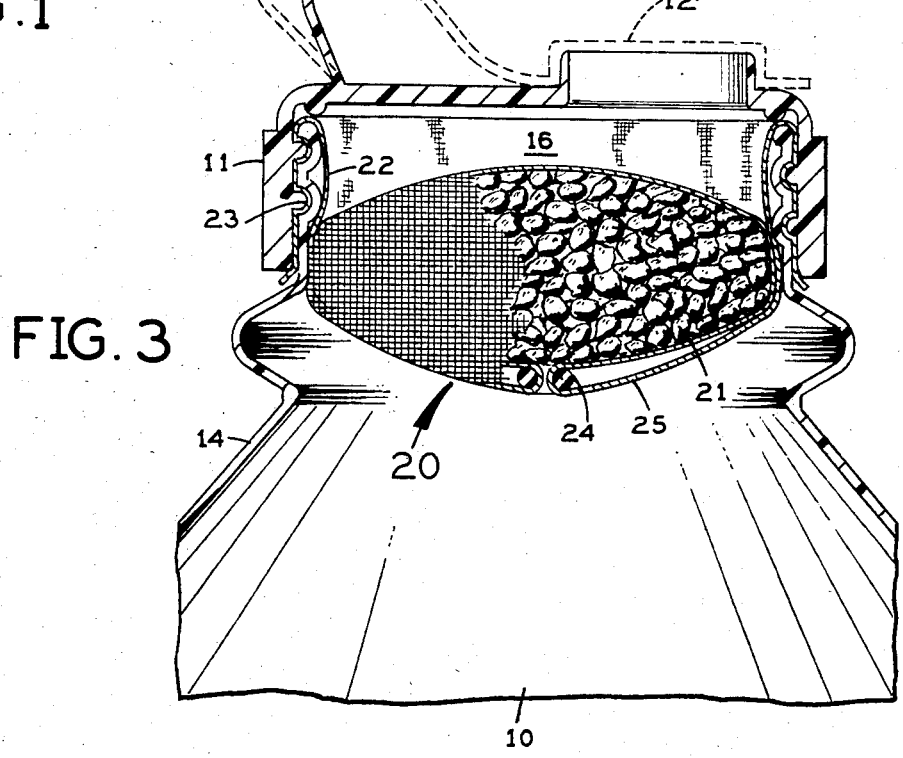
FIG.3

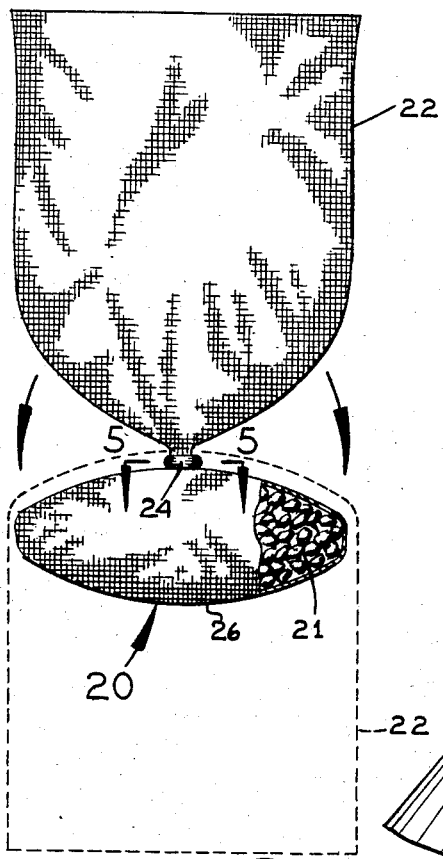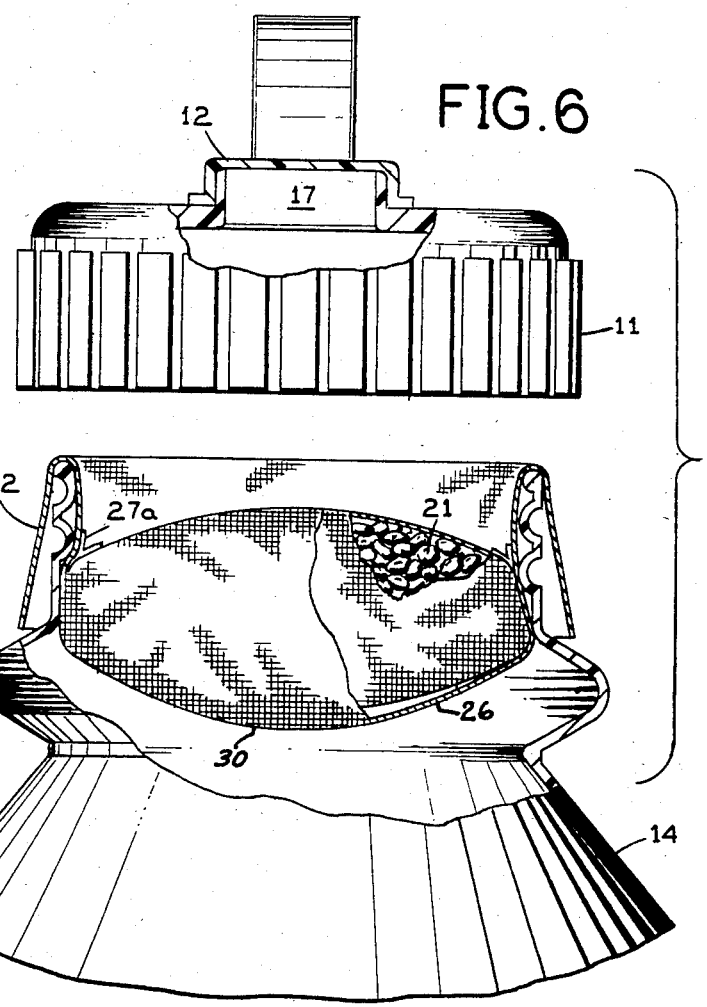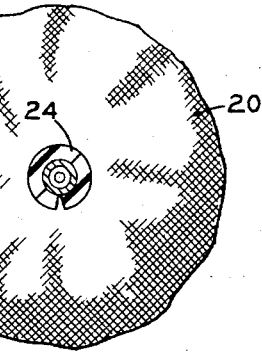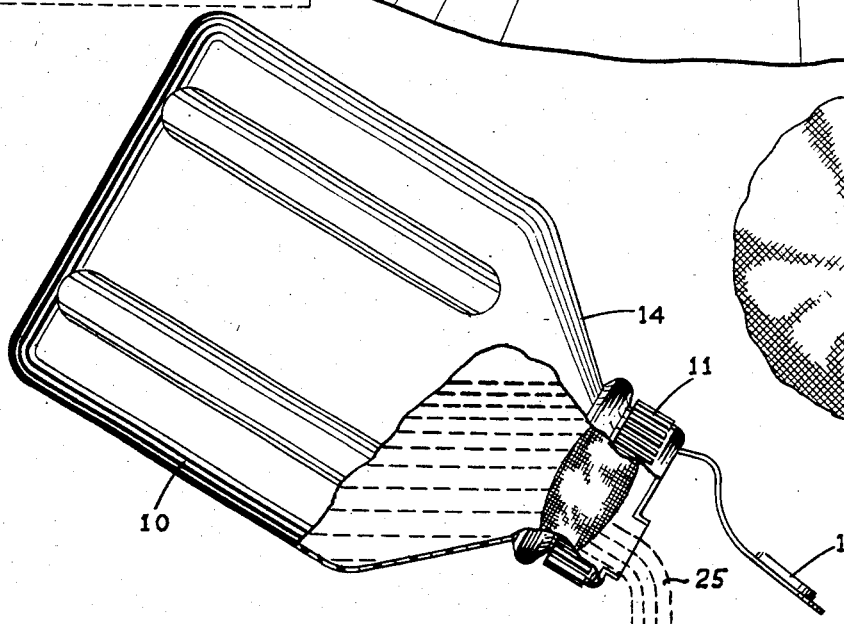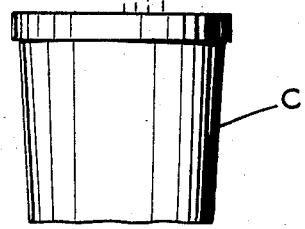

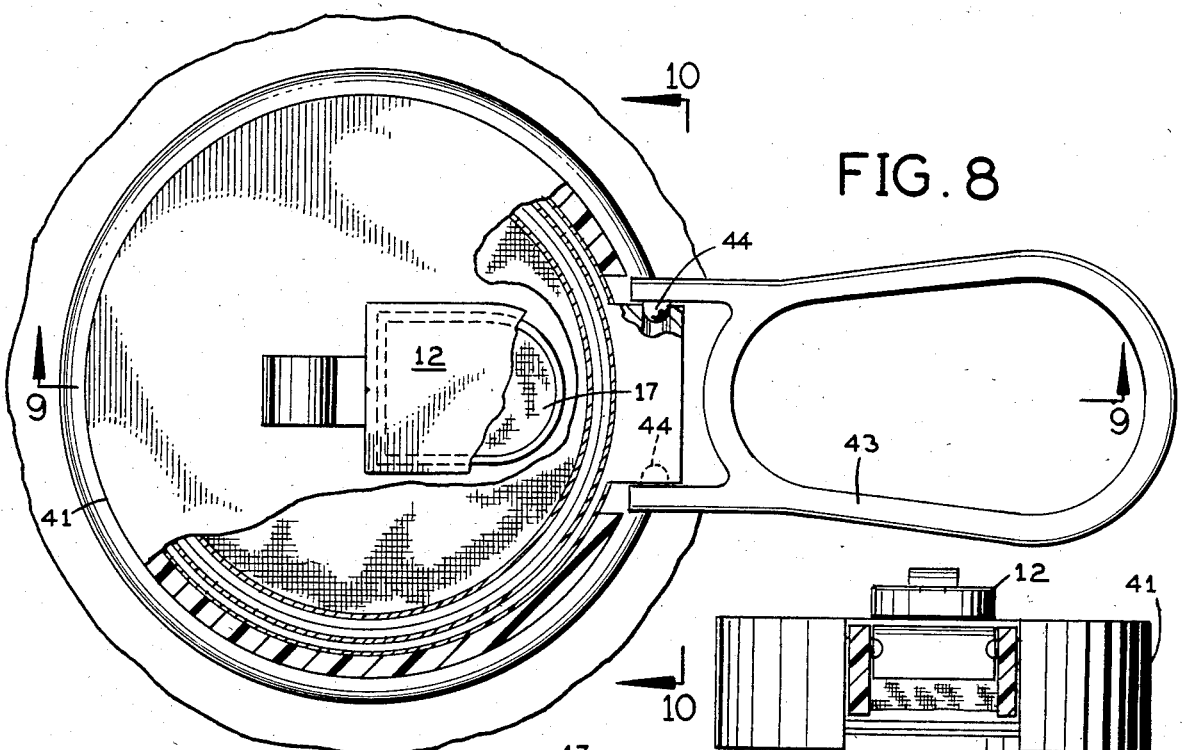
FIG. 8
FIG. 10
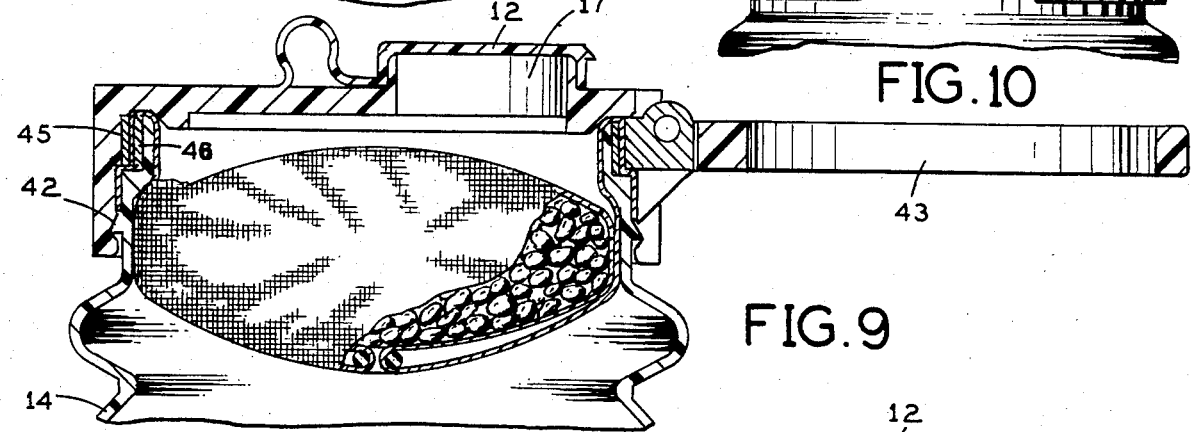
FIG. 9
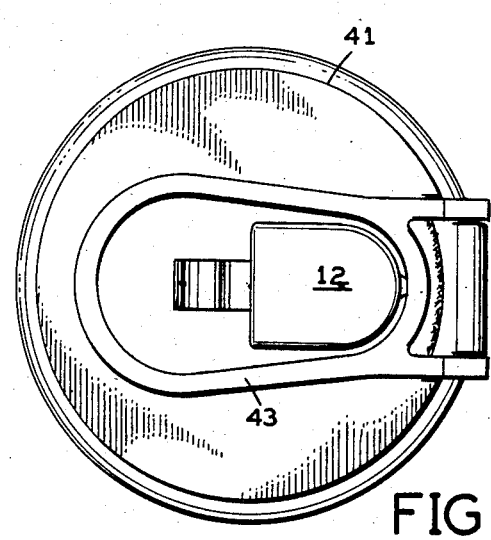
FIG. 11
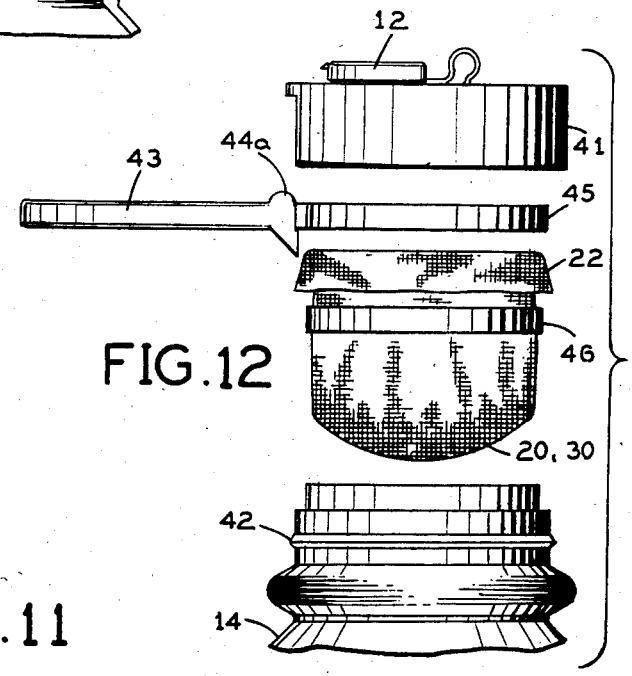
FIG. 12

WATER FILTER

BACKGROUND AND PRIOR ART

The invention relates to water filters and more particularly to a portable disposable fresh water filter for purifying tap water.

It is well known that in many localities the degree of purity of the tap water is far from the degree that is satisfactory for human consumption.

Inventors have in the past sought ways to provide suitable methods of improving the purity of fresh water.

U.S. Pat. No. 4,025,438 shows a filter cartridge with several layers of different filtering media, for insertion into a suitable tap-connected filter housing.

U.S. Pat. No. 4,016,080 shows a filter cartridge with multiple layers of filter media disposed inside the filter cartridge at an angle in order to improve fluid flow through the filter.

U.S. Pat. No. 3,900,395 shows a filtering apparatus having layers of anthracite coal and black walnut shells as filter media.

U.S. Pat. No. 3,469,696 shows a cartridge-type water filter especially suited for removing scale and other impurities from water.

U.S. Pat. No. 651,948 shows a portable, funnel-shaped filter containing replaceable layers of granulated filter media for filtering small amounts of drinking water.

All of the inventions disclosed in the prior art suffer from the drawback that they are cumbersome to use for individuals who only desire to filter small amounts of drinking water and wish not to be tied to a fixed filter installation or having to be bothered by preparing elaborate filter media or mixtures thereof. Applicant has overcome this problem by providing a portable disposable filter that is convenient in use and may be used in any locality, and is sufficiently inexpensive that it may be discarded when the filter medium has been spent. It is not necessary to carry bottles from the store, and the filter is extremely inexpensive.

SUMMARY OF THE INVENTION

The portable disposable filter according to the invention consists essentially of a filter part cnsisting of two layers of a porous containing material or fabric which contains confined between the two layers, a measured, small amount of filter medium.

The containing material may be any water resistant woven fabric such as cheesecloth, or a fibrous material such as waterproof paper or suitably woven or matted synthetic fiber, which, by itself may provide part of the filtering process. The filter medium may advantageously be granular, activated charcoal which is a well known highly effective filter medium, but the scope of the invention shall not be confined to any particular type of filter medium, since it is capable of working with any suitable granulated filter medium.

In one of its more preferred embodiments the portable filter, according to the instant invention, consists of a section of hose, made of containing fabric, which is closed at one end, into which is poured a measured small amount of filter medium, such as a teaspoon or less. The hose immediately above the filter medium is constricted by means of a suitable drawstring, rubber band or the like so that a small pouch enclosing the filter medium is formed. The remaining hose section is next folded inside-out forming an upward projecting skirt encircling the pouch filled with filter medium, which can next conveniently be lowered into a wide-mouth water jar or container with a threaded neck, which fits under a standard faucet, with the skirt folded over the upper edge of the neck of the mouth, so that unfiltered water can be poured into the jar where it is filtered as it percolates through the filter medium, and is collected and stored as filtered water in the jar. The water is filtered again when it is poured out.

In another embodiment, the water container may have a screw-on or press-on lid that can be screwed over the top of the jar's neck and hold in place the folded-over skirt of the filter. The lid may advantageously have an opening for pouring water into the jar, and the opening may have a snap-on cap and/or may be adapted to receive the end of a water hose for filling the jar, or a pouring spout.

In still another embodiment, the screw-on lid may have a folding handle which in an extended position is helpful in tightly screwing the lid onto the neck of the jar and for holding the filter. In still another embodiment the screw-on lid may have an opening adapted to receive a pouring spout.

In still another embodiment the portable filter part may be constructed of two coordinated circular pieces of containing fabric which are joined at the edges and contain filter medium in the space between the two pieces.

In still another embodiment with the two pieces of coordinated containing fabric, the upper piece may be porous, while the lower piece is impermeable except for a small center opening or grid so that the lower piece acts as a funnel, for urging the filtered water percolating through the filter medium, toward the middle of the filter, from where it pours into the jar. In still another embodiment, the lower coordinated piece may be formed of rather rigid aluminum foil that can be shaped into a cone, bowl or hemisphere with small holes or a grid in the bottom that contains the filter medium granules but lets water pass through. In still another embodiment, the bottom piece of aluminum may have radially projecting handle parts, so that the filter can be placed over the mouth of the jar without falling into the jar. The projecting parts may have a hole or eyelet for hanging the filter part when not in use.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is a vertical elevational view of a wide mouth water jar with a neck and a screw-on lid adapted to receive a waterhose and a removable snap-on cap.

FIG. 2 is a top-down view of the water jar of FIG. 1.

FIG. 3 is a vertical cross-sectional, fragmentary view of the top of the water jar with a screw-on lid, taken along the line 3—3 of FIG. 2, also showing a cross-section of the portable water filter part containing granular filter medium and held in place by the upward projecting skirt pinched between the neck of the jar and the screw-on lid.

FIG. 4 shows steps of forming the water filter part from a closed section of porous hose.

FIG. 5 is a bottom-up view of the finished filter, showing the constricted bottom opening of the filter part, taken along the line 5—5 of FIG. 4.

FIG. 6 is a vertical, fragmentary, part cross-sectional view showing an embodiment consisting of two coordinated circular pieces of containing fabric, of which the upper one is joined at the edge to the inside of the lower piece, the two pieces forming a space for containing filter medium, and the filter part disposed inside the neck of a jar with a detached screw-on lid.

FIG. 7 is a vertical, part cross-sectional view of a water jar in position for pouring filtered water into a drinking glass.

FIG. 8 is a top-down view of the invention showing part of the water jar with a screw-on lid with a folding handle in the extended position, with a snap-on cap.

FIG. 9 is an elevational, fragmentary cross-sectional view of the filter according to FIG. 8, taken along the line 9—9 of FIG. 8.

FIG. 10 is a vertical, part cross-sectional, fragmentary view of the filter according to FIG. 8, taken along the line 10—10 of FIG. 8.

FIG. 11 is a top-down view of the screw-on lid showing the folding handle in closed position.

FIG. 12 is a vertical exploded view of the filter according to FIG. 8 showing the lid, the folding handle, a filter part with a ring for holding the filter part attached to the neck of a water jar.

Figure 13:
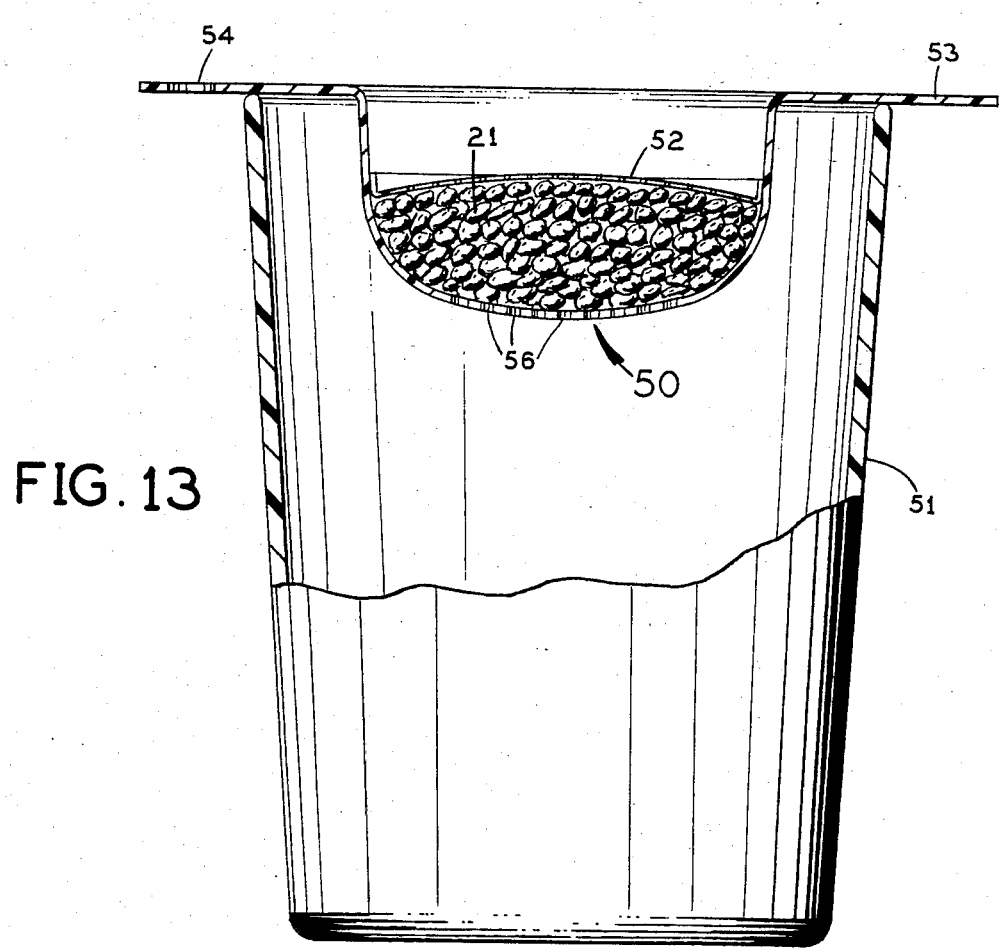
FIG. 13 shows an embodiment of the filter, seen in a vertical, part cross-sectional fragmentary view, which consists of two coordinated pieces of containing material of which the lower piece is formed of aluminum foil, disposed over the mouth of a water glass.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DESCRIPTION OF THE PREFERRED EMBODIMENT

FIGS. 1, 2, 3 and 5 show a water jar or any other suitable water container for holding water, having a neck 14 with a wide mouth 16 closed by a screw lid 11, attached by screw threads 23 to the outside threaded neck 14. The lid has an opening 17 for pouring water with a matching cap 12 for closing the opening 17. The cap 12 may have a flexible strap 18 for attaching the cap 17 to the top of the lid 11.

A filter unit 20 consists essentially of a containing fabric forming a hose closed at one end which holds a measured small amount of granulated filter medium 21. The filter medium 21 may advantageously be granular activated charcoal which is well known to be an effective filter medium. The filter medium, however, shall not be confined to granular charcoal alone since other filter media or compositions thereof are known. The closed end of the hose containing the filter medium is constricted by a drawstring, strap or rubber ring 24 so that a pouch 26 containing the filter medium 21 is formed. The hose may even be twisted to form the constriction. As seen in FIG. 4 the pouch 26 has been formed of the close-ended hose consisting of the containing fabric 22. By pulling tight the drawstring 24, and turning the open ended part of the hose inside-out as seen in FIG. 3 the open end of the hose forms a skirt 22 that can be folded over the edge of the neck 14 and the screw lid 11 can be screwed onto the neck 14 with the folded part of the skirt 22 pinched between the threaded outside of the neck 14 and the inside of the screw lid 11, thereby holding the filter unit 20 suspended by the skirt 22 in the mouth 16 of the jar 10.

In operation, unfiltered water may be poured through the opening 17, e.g. via the hose 13 from where it percolates through the filter medium 21 and drops into the jar 10 as filtered water. After some use, the filter medium will be saturated with accumulated impurities from the water and the whole filter unit 20 may be discarded and replaced with a new unit. When not in use, the opening 17 in the lid 11 may be closed with a snap-on cap 12. FIG. 6 shows in an exploded view the screw lid 11 with the opening 17 before it is screwed onto the neck 14, where it holds a filter unit 30 of a somewhat different construction than the construction 20, described hereinabove. In the embodiment 30 according to FIG. 6, the filter unit 30 consists of a circular piece of containing fabric 22 and 26 containing granulated filter medium 21. Another separate piece of containing fabric 27, cut as a coordinated substantially circular piece of fabric 27 is attached, at the edges 27a, to the inside of the skirt 22 by sewing, adhesive, cementing or any other suitable process, so that the filter medium 21 is contained between the two layers of fabric 26 and 27.

The fabric 26 and 27 may be a coarse woven fabric such as gauze, cheese cloth, or a felted fibrous material or water-fast paper, such as is well known filter paper and the like.

In one very advantageous embodiment the layers 26 and 27 may by themselves have filtration characteristics that further augment the filter medium 21.

In another embodiment, according to FIG. 6, the outer containing fabric 26 with the skirt 22 may be a material with little or no water permeability and may instead have a plurality of fine openings at the bottom center for passing the filtered water, and small enough for containing the granules of the filter medium 21. Such an arrangement has the advantage that the water-flow through the filter unit 30 is urged toward the middle of the bottom layer which provides a good, more penetrating water flow since water to be filtered cannot simply traverse the peripheral part of the filter unit.

FIG. 7 shows filtered water 25 being poured into a drinking glass C, while it traverses the filter medium 21 a second time for additional purification.

FIGS. 8, 9, 10, 11 and 12 show an embodiment of the filter in which a lid 40 is a snap on lid that can be snapped or pressed onto the neck 14 of the jar to be retained by a circular ridge 42 on the outside of the neck 14. This embodiment advantageously has a fold-out handle 43 pivotably attached at pivot points 44 to a first ring 45 that fits tightly inside the rim 41a of the lid 41. The first ring 45 with the handle 43 pivotably attached may serve to hold the filter skirt pinched between the outside of the ring 45 and the inside of the rim of the lid 41.

In a somewhat different embodiment, a second ring 46 may be used to hold the skirt 22 pinched to the inside of the first ring 45. This arrangement has the advantage that the filter unit 20, 30 may be carried by the handle 43 and held over a container such as the jar 10 or another container for temporarily collecting filtered water. The folding handle 43 may be retracted as seen in FIG. 11, in which position it is folded over the lid 41.

Figure 14:
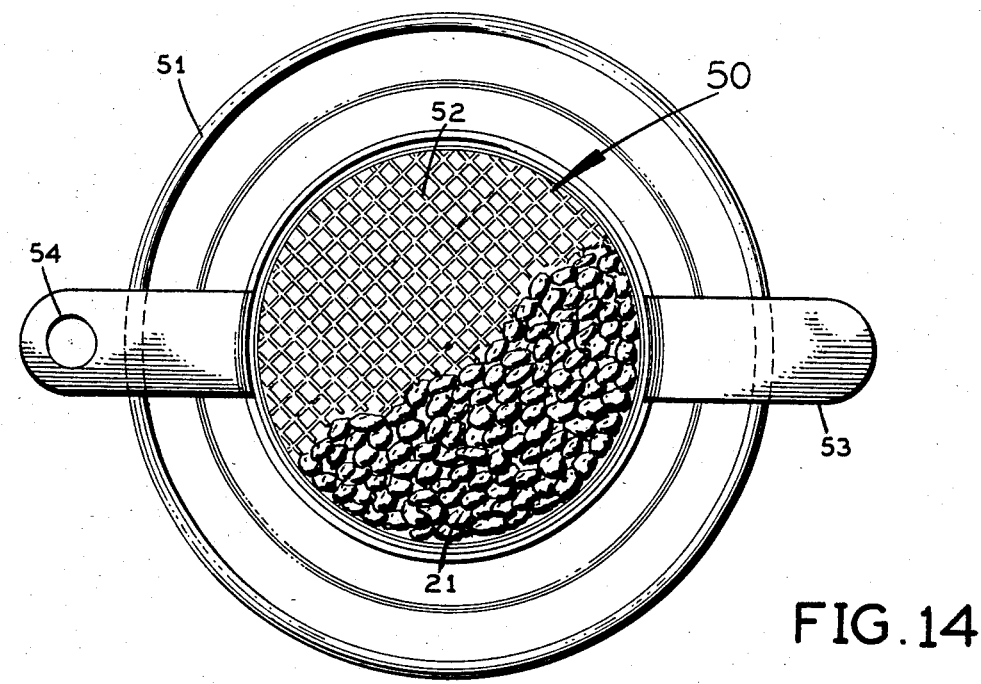
FIG. 14 is a topdown view of the embodiment according to FIG. 13, with part of the top piece broken away to show the granular filter medium.

Still another embodiment of the invention for use with a container is seen in FIGS. 13 and 14, which show a filter unit 50 having an outer layer of a relatively stiff metal foil, shaped as a shallow hemispheric bowl 55 containing granular filter medium 21 and having a number of small holes 56 punched in the bottom, so that filtered water can pass through the holes but not the filter granules 21. An upper layer 51 of containing fabric encloses the filter medium from the upper side and is advantageously attached at its edges 56 to the inner wall of the bowl 55 by bonding, stapling or any other suitable method. The bowl 55 may have two extensions 53 that can serve as handles and can also be used as retainers so that the filter unit 50 can be placed over a drinking glass 51 for producing a small amount of filtered water. A hole 54 in one or both handles 53 may serve to hang the filter unit on a hook when not in use.

The entire filter unit 50 may be constructed inexpensively and may advantageously be discarded and replaced when the filter medium 21 is spent.

In operation it has been found that an amount of ½ ounce of granulated activated charcoal in a filter according to the invention, can be used to make approximately 100 gallons of purified water, before it must be replaced.

I claim:

1. A portable disposable water filter comprising:
   a filter unit having a measured amount of filter medium;
   a pouch of containing material for containing the filter medium;
   a water container for containing filtered water having a mouth, a neck and a body; and
   means for suspending the filter unit in the mouth of the water container including a substantially circular skirt extending from said pouch of containing material;
   said filter unit further comprising:
   a larger sheet of containing material having a middle and a larger, substantially circular perimeter and an upper side;
   a second smaller sheet of containing material, said second sheet having a smaller, substantially circular perimeter, the second sheet attached along said second perimeter to the upper side of said first sheet of containing material, and leaving an outer part of said first larger sheet of containing material outside said smaller perimeter;
   said first and second sheets forming between them said pouch for containing the filter medium; and
   said outer part of said larger sheet forming said skirt.

2. A water filter according to claim 1 wherein said filter medium comprises granulated, activated charcoal.

3. A water filter according to claim 1 wherein said larger sheet of containing material comprises metal foil, said metal foil shaped as a bowl having an upper rim, for containing filter medium, said bowl having perforations in the bottom for passing filtered water.

4. A water filter according to claim 3 further comprising handles extending radially away from said upper rim of the bowl.

* * * * *